(12) United States Patent
Wang et al.

(10) Patent No.: US 10,865,152 B2
(45) Date of Patent: Dec. 15, 2020

(54) POLYCRYSTALLINE DIAMOND COMPACT

(71) Applicant: SF DIAMOND CO., LTD., Zhengzhou (CN)

(72) Inventors: Caili Wang, Zhengzhou (CN); Dongpeng Zhao, Zhengzhou (CN); Saifei Yang, Zhengzhou (CN); Haijiang Fang, Zhengzhou (CN)

(73) Assignee: SF DIAMOND CO., LTD., Zhengzhou (CN)

( * ) Notice: Subject to any disclaimer, the term of this patent is extended or adjusted under 35 U.S.C. 154(b) by 0 days.

(21) Appl. No.: 16/352,830

(22) Filed: Mar. 14, 2019

(65) Prior Publication Data

US 2019/0210931 A1     Jul. 11, 2019

Related U.S. Application Data

(63) Continuation-in-part of application No. PCT/CN2017/105473, filed on Oct. 10, 2017.

(30) Foreign Application Priority Data

May 9, 2017 (CN) ...................... 2017 2 0507241 U

(51) Int. Cl.
  *C04B 37/02* (2006.01)
  *C22C 26/00* (2006.01)
  *E21B 10/567* (2006.01)
  *E21B 10/46* (2006.01)

(52) U.S. Cl.
  CPC ............ *C04B 37/028* (2013.01); *C22C 26/00* (2013.01); *E21B 10/46* (2013.01); *E21B 10/567* (2013.01); *E21B 10/5676* (2013.01); *C04B 2237/363* (2013.01); *C04B 2237/401* (2013.01); *C04B 2237/68* (2013.01)

(58) Field of Classification Search
  CPC ............ C04B 37/028; C04B 2237/363; C04B 2237/401; C04B 2237/68; E21B 10/46; E21B 10/567; E21B 10/5676; C22C 26/00
  USPC ........................................................ 175/428
  See application file for complete search history.

(56) References Cited

U.S. PATENT DOCUMENTS 10,610,999 B1 * 4/2020 Heaton ..................... C25F 1/00

* cited by examiner

*Primary Examiner* — Matthew R Buck
*Assistant Examiner* — Patrick F Lambe
(74) *Attorney, Agent, or Firm* — Matthias Scholl P.C.; Matthias Scholl

(57) ABSTRACT

A polycrystalline diamond compact including a cemented carbide substrate and a polycrystalline diamond layer bonded to the cemented carbide substrate. The cemented carbide substrate is cylindrical and includes a circumferential wall. The polycrystalline diamond layer includes a central part including between 8 and 15 wt. % of cobalt and an outer part including between 0.5 and 2 wt. % of cobalt. The outer part is a columnar ring belt and includes a chamfer. The outer part includes an upper surface, a side surface connected to the circumferential wall of the cemented carbide substrate, and a chamfer surface connecting the upper surface and the side surface. The chamfer includes a first terminal connected to the upper surface of the outer part and a second terminal connected to the side surface of the outer part.

4 Claims, 3 Drawing Sheets

POLYCRYSTALLINE DIAMOND COMPACT

CROSS-REFERENCE TO RELATED APPLICATIONS

This application is a continuation-in-part of International Patent Application No. PCT/CN2017/105473 with an international filing date of Oct. 10, 2017, designating the United States, now pending, and further claims foreign priority benefits to Chinese Patent Application No. 201720507241.4 filed May 9, 2017. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND

This disclosure relates to the field of composite materials, and more particularly, to a polycrystalline diamond compact (PDC).

Polycrystalline diamond compacts (PDCs) are composed of diamond and a tungsten carbide/cobalt (WC/Co) substrate; they are synthesized at high pressure and high temperature (HPHT).

Cobalt is essential for PDCs synthesis. However, in addition to its desired role as a binder, it also acts as a catalyst for transforming diamond to graphite, which is detrimental. Specifically, during the drilling process, the existence of catalytic cobalt can induce the transformation of diamond to graphite, resulting in reduction of thermal stability and abrasive resistance of the PDCs. In addition, the difference of the thermal expansion coefficients between diamond and cobalt leads to thermal stress and micro-crack, shortening the service life of the PDCs.

SUMMARY

Disclosed is a polycrystalline diamond compact exhibiting relatively high thermal stability and abrasive resistance.

Disclosed is a polycrystalline diamond compact comprising a cemented carbide substrate and a polycrystalline diamond layer bonded to the cemented carbide substrate. The cemented carbide substrate is cylindrical and comprises a circumferential wall; the polycrystalline diamond layer comprises a central part comprising between 8 and 15 wt. % of cobalt and an outer part comprising between 0.5 and 2 wt. % of cobalt; the outer part is a columnar ring belt and comprises a chamfer; the outer part comprises an upper surface, a side surface connected to the circumferential wall of the cemented carbide substrate, and a chamfer surface connecting the upper surface and the side surface; the chamfer comprises a first terminal connected to the upper surface of the outer part and a second terminal connected to the side surface of the outer part; the vertical distance between the upper surface of the outer part and the second terminal of the chamfer is between 0.3 and 1.0 mm; the vertical distance between a middle point of the first terminal and the second terminal and the central part is between 0.35 and 1.0 mm; the axial height of the outer part is between 1.2 and 2.2 mm; and the vertical distance between the side surface of the outer part and the first terminal of the chamfer is between 0.2 and 0.6 mm.

The width of the columnar ring belt of the outer part can be between 1.8 and 2 mm.

The polycrystalline diamond compact of the disclosure is sintered and synthesized with cobalt as a binding agent. To eliminate the side effect caused by the cobalt, decobalting is carried out to the polycrystalline diamond compact. Decobalting of the polycrystalline diamond layer is achieved by using acid leaching, electrolysis, or high temperature catalyst method, and during decobalting, the cemented carbide substrate is sealed using cyanoacrylate glue, paraffin wax, synthetic rubber, polytetrafluoroethylene, polyethylene, or polypropylene.

Advantages of the polycrystalline diamond compact in the disclosure are summarized as below. The polycrystalline diamond compact comprises a central part and an outer part with different cobalt contents. The cobalt contents vary along the axial direction and the radial direction of the polycrystalline diamond layer. Compared with conventional PDCs, the polycrystalline diamond compact exhibits better thermal stability, impact resistance and wear resistance.

Figure 1:
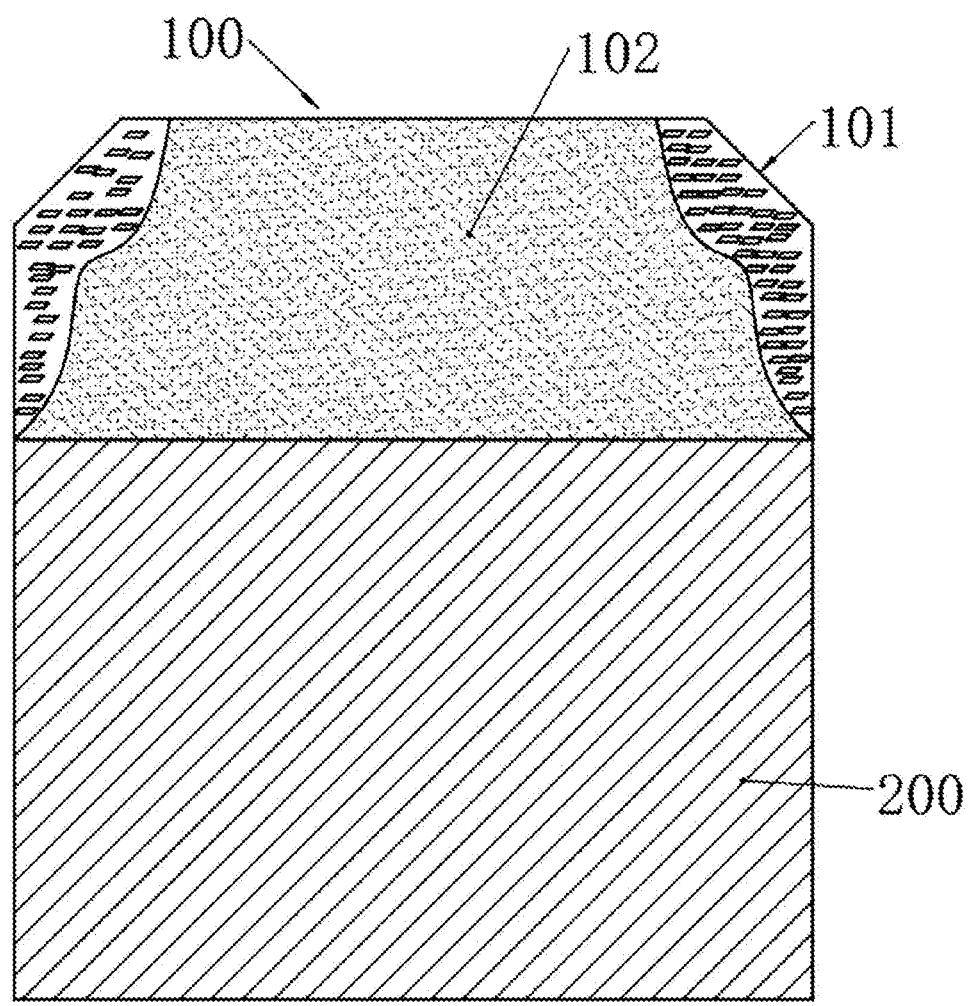
FIG. 1 is a sectional view of a polycrystalline diamond compact as described in the disclosure.

In the drawings, the following reference numbers are used: 100. Polycrystalline diamond layer; 101. Outer part; 102. Central part; 200. Cemented carbide substrate.

DETAILED DESCRIPTION

To further illustrate, examples detailing a polycrystalline diamond compact are described below. It should be noted that the following examples are intended to describe and not to limit the description.

Example 1

Figure 2:
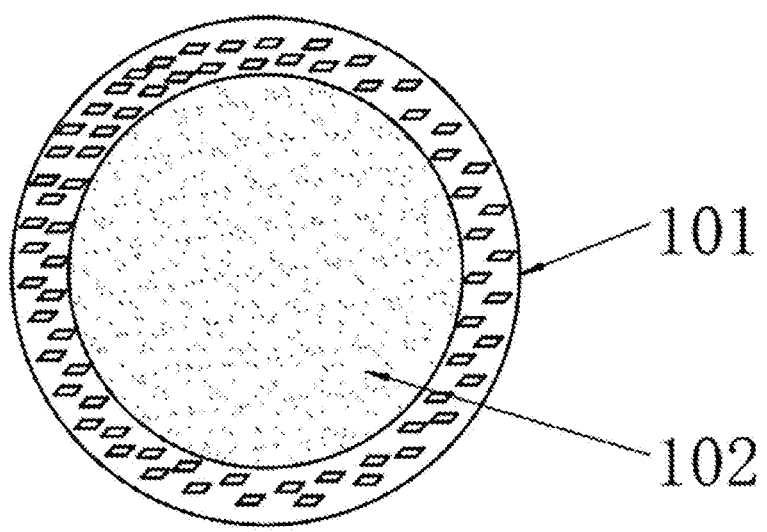
FIG. 2 is a top view of a polycrystalline diamond compact as described in the disclosure.

FIG. 1 shows a sectional view of a polycrystalline diamond compact (PDC), which comprises a cemented carbide substrate 200 and a polycrystalline diamond layer 100 bonded to the cemented carbide substrate 200. FIG. 2 is a top view of the polycrystalline diamond compact, which shows the polycrystalline diamond layer comprises a central part 102 and an outer part 101, and the outer part 101 is a columnar ring belt and comprises a chamfer.

Figure 3:
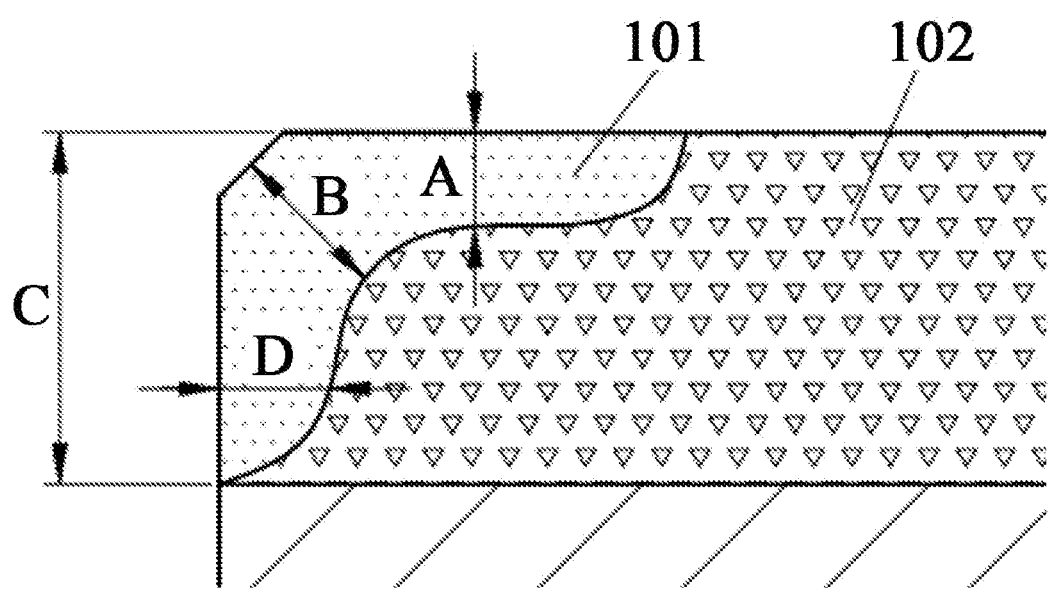
FIG. 3 shows a chamfer of an outer part of a polycrystalline diamond compact as described in the disclosure, where A indicates the vertical distance between the upper surface of the outer part and the second terminal of the chamfer; B indicates the vertical distance between a middle point of the first terminal and the second terminal and the central part; C indicates the axial height of the outer part; and D indicates the vertical distance between the side surface of the outer part and the first terminal of the chamfer.

In this example, the diameter of the polycrystalline diamond compact is 13.44 mm, and the thickness thereof is 2.2 mm. The polycrystalline diamond compact is synthesized at high pressure and high temperature (HPHT) and then is decobalted. During decobalting, the cemented carbide substrate is sealed using paraffin wax, and the polycrystalline diamond compact is immersed in an acid for 240 hrs. Thereafter, the cobalt concentration is measured. The results show the central part comprises 10 wt. % of cobalt and the outer part comprises 1.2 wt. % of cobalt. The acid immersion greatly reduces the cobalt content of the outer part with regard to the central part. The width of the columnar ring belt is 1.8 mm. The outer part comprises an upper surface, a side surface connected to the circumferential wall of the cemented carbide substrate, and a chamfer surface connecting the upper surface and the side surface. The chamfer comprises a first terminal connected to the upper surface of the outer part and a second terminal connected to the side surface of the outer part. As shown in FIG. 3, the vertical distance A between the upper surface of the outer part and the second terminal of the chamfer is 0.3 mm. The vertical distance B between the middle point of the first terminal and the second terminal and the central part is 0.38 mm. The axial height C of the outer part is 1.9 mm. The vertical distance D between the side surface of the outer part and the first terminal of the chamfer is 0.2 mm.

Compared with conventional cobalt-containing PDCs and PDCs containing no cobalt, the decobalted polycrystalline diamond compact as described in the disclosure exhibits better service behavior. The test results show that the wear resistance of the decobalted polycrystalline diamond compact is increased by 30% and 6% respectively in contrast to conventional cobalt-containing PDCs and PDCs containing no cobalt, impact resistance by 80% and 40%, thermal stability by 35% and 10%, and no cracks or delamination occurs in the radial direction.

Example 2

In this example, the diameter of the polycrystalline diamond compact is 15.88 mm, and the thickness thereof is 2.2 mm. The polycrystalline diamond compact is synthesized at high pressure and high temperature (HPHT) and then is decobalted. During decobalting, the cemented carbide substrate is sealed using polytetrafluoroethylene, and the polycrystalline diamond compact is electrolyzed for 360 hrs. Thereafter, the cobalt concentration is measured. The results show the central part comprises 9 wt. % of cobalt and the outer part comprises 0.8 wt. % of cobalt. The acid immersion greatly reduces the cobalt content of the outer part with regard to the central part. The width of the columnar ring belt is 2.0 mm. The outer part comprises an upper surface, a side surface connected to the circumferential wall of the cemented carbide substrate, and a chamfer surface connecting the upper surface and the side surface. The chamfer comprises a first terminal connected to the upper surface of the outer part and a second terminal connected to the side surface of the outer part. The vertical distance A between the upper surface of the outer part and the second terminal of the chamfer is 0.4 mm. The vertical distance B between the middle point of the first terminal and the second terminal and the central part is 0.5 mm. The axial height C of the outer part is 1.85 mm. The vertical distance D between the side surface of the outer part and the first terminal of the chamfer is 0.35 mm.

Compared with conventional cobalt-containing PDCs and PDCs containing no cobalt, the decobalted polycrystalline diamond compact as described in the disclosure exhibits better service behavior. The test results show that the wear resistance of the decobalted polycrystalline diamond compact is increased by 50% and 8% respectively in contrast to conventional cobalt-containing PDCs and PDCs containing no cobalt, impact resistance by 110% and 50%, thermal stability by 45% and 15%, and no cracks or delamination occurs in the radial direction.

It will be obvious to those skilled in the art that changes and modifications may be made, and therefore, the aim in the appended claims is to cover all such changes and modifications.

What is claimed is:

1. A polycrystalline diamond compact, comprising:
a cemented carbide substrate; and
a polycrystalline diamond layer bonded to the cemented carbide substrate;
wherein:
the cemented carbide substrate is cylindrical and comprises a circumferential wall;
the polycrystalline diamond layer comprises a central part comprising between 8 and 15 wt. % of cobalt and an outer part comprising between 0.5 and 2 wt. % of cobalt;
the outer part is a columnar ring belt and comprises a chamfer;
the outer part comprises an upper surface, a side surface connected to the circumferential wall of the cemented carbide substrate, and a chamfer surface connecting the upper surface and the side surface;
the chamfer comprises a first terminal connected to the upper surface of the outer part and a second terminal connected to the side surface of the outer part;
a vertical distance between the upper surface of the outer part and the second terminal of the chamfer is between 0.3 and 1.0 mm;
a vertical distance between a middle point of the first terminal and the second terminal and the central part is between 0.35 and 1.0 mm;
an axial height of the outer part is between 1.2 and 2.2 mm; and
a vertical distance between the side surface of the outer part and the first terminal of the chamfer is between 0.2 and 0.6 mm.

2. The polycrystalline diamond compact of claim 1, wherein a width of the columnar ring belt of the outer part is between 1.8 and 2 mm.

3. A polycrystalline diamond compact, comprising:
a cemented carbide substrate; and
a polycrystalline diamond layer bonded to the cemented carbide substrate, the polycrystalline diamond layer consisting of a central part and an outer part;
wherein:
the cemented carbide substrate is cylindrical and comprises a circumferential wall;
the central part comprises between 8 and 15 wt. % of cobalt;
the outer part comprises between 0.5 and 2 wt. % of cobalt;
the outer part is a columnar ring belt and comprises a chamfer;
the outer part comprises an upper surface, a side surface connected to the circumferential wall of the cemented carbide substrate, and a chamfer surface connecting the upper surface and the side surface;
the chamfer comprises a first terminal connected to the upper surface of the outer part and a second terminal connected to the side surface of the outer part;
a vertical distance between the upper surface of the outer part and the second terminal of the chamfer is between 0.3 and 1.0 mm;
a vertical distance between a middle point of the first terminal and the second terminal and the central part is between 0.35 and 1.0 mm;
an axial height of the outer part is between 1.2 and 2.2 mm; and
a vertical distance between the side surface of the outer part and the first terminal of the chamfer is between 0.2 and 0.6 mm.

4. The polycrystalline diamond compact of claim 3, wherein a width of the columnar ring belt of the outer part is between 1.8 and 2 mm.

\* \* \* \* \*